(12) United States Patent
Hatayama

(10) Patent No.: US 6,195,340 B1
(45) Date of Patent: Feb. 27, 2001

(54) WIRELESS NETWORK SYSTEM AND WIRELESS COMMUNICATION APPARATUS OF THE SAME

(75) Inventor: Akihiro Hatayama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/002,379

(22) Filed: Jan. 2, 1998

(30) Foreign Application Priority Data

Jan. 6, 1997 (JP) ................................................ 9-000257

(51) Int. Cl.[7] ................................ H04J 4/00; H04Q 7/20
(52) U.S. Cl. ........................ 370/319; 370/343; 370/346; 370/347; 370/437
(58) Field of Search ................................ 370/312, 319, 370/321, 326, 346, 347, 348, 437, 343, 344

(56) References Cited

U.S. PATENT DOCUMENTS 6,041,233 * 3/2000 Rosati .................................. 455/427

* cited by examiner

Primary Examiner—Melvin Marcelo
(74) Attorney, Agent, or Firm—Oblon, Spivak, McClelland, Maier & Neustadt, P.C.

(57) ABSTRACT

A wireless network system comprising a master station, a plurality of slave stations, the master station and the plurality of slave station being connected in a star shape through an outbound wireless line having a predetermined first transmission band area and a plurality of inbound wireless lines having a second transmission band area narrower than the outbound wireless line, a determination section for determining whether a time-division multiplex transmission method is suitable or a broadcast transmission method is suitable for the outbound transmission method in accordance with the system application at a time of transmitting the outbound data in correspondence to a desired system application to the plurality of slave stations from the master station through the outbound wireless line, and an outbound line control section for setting a transmission path corresponding to the outbound transmission method determined to be suitable by the determination section on the outbound wireless line between the master station and the slave station.

36 Claims, 9 Drawing Sheets

WIRELESS NETWORK SYSTEM AND WIRELESS COMMUNICATION APPARATUS OF THE SAME

BACKGROUND OF THE INVENTION

The present invention relates to a wireless network system for performing a bidirectional transmission of data through a communication satellite, for example, between a master station and a plurality of slave stations, and to a wireless communication apparatus used as a master station in this system.

In a satellite communication system, a connecting aspect for connecting in a multiplex manner between a plurality of earth stations includes a mesh type and a star type.

In the mesh type system, for example, as shown in FIG. 1, slave stations B3 and Bn in an idle state among a plurality of slave stations B1 to Bn are connected to a master station A through a common line C and, slave stations B1 and B2 in an information communication state are directly connected to slave stations B5 and B4 for the communication object through a communication line T.

The connection between the slave stations is controlled by a line control device provided in the master station A. FIG. 2 shows an embodiment of a connection sequence of the same. Accordingly, the slave station (a transmission station) which is going to sends a communication request signal to the master station A through the common line C. When the master station A receives the communication request signal, the master station A sends an incoming call instruction signal to the opposite slave station (a reception station) through the common line C and wait for returning of an incoming call response signal from the reception station. Further, when the incoming call response signal is returned, the master station A sends a line allocation signal to the transmission station and the reception station through the common line C. The transmission station and the reception station captures the communication line allocated by the line allocation signal, and thereafter, they become in a communication state. When the communication is terminated, a line deallocation information signal is transmitted to the master station A from each of the transmission station and the reception station through the common line C, and the master station confirms a deallocation of the line by the signal and transmits the deallocation information signal to each of the slave stations in the transmission side and the reception side. Accordingly, a demand assigned multiple access method (DAMA) is employed for an access method.

The mesh type system has an advantage that the communication can be directly performed between the slave stations, however, since each of the slave stations has to be provided with a transmitting/receiving equipment capable of performing a communication with the slave station on the smallest scale among the system, there is a disadvantage that a size of the slave station is made large and it is hard to structure an economical system. Further, in the case of performing a broadcast communication, it is necessary to prepare an exclusive line for the broadcast in addition to the common line.

In comparison with this, in the star type system, for example, as shown in FIG. 3, each of the slave stations B1 to Bn is connected to the master station A, and all the communication between the slave stations is performed through the master station A. Accordingly, all of each of the slave stations B1 to Bn has to do is to perform a communication with the master station A, so that the slave station can be made simple and compact by making the master station A share a main portion of the communication equipment, thereby structuring a system more economical than the mesh type system.

In this case, in the conventional star type system, as the line for connecting between the master station A and each of the slave stations B1 to Bn, an inbound line and an outbound line having a different frequency are prepared. Among them, the outbound line is used in the case that the master station A transmits the data to the slave stations B1 to Bn. Since this transmission is performed under a control of the master station A, a conflict and a collision are not generated.

In the inbound line, since a plurality of slave stations B1 to Bn independently use a common radio frequency, there is a case that the conflict and the collision are generated. Then, in the conventional art, for example, the following access methods are employed.

a. Random Access Method

This is a method that each of the slave stations uses the line in such a manner that first come, first served, and in this method, a control sequence is simple. However, the line can be used only to a physical level of 1/e (in which e is a base of a natural logarithm) as a use efficiency (a throughput) of the line, so that there is much uselessness. Further, in the case that a traffic is increased, the line becomes an overcrowding state, so that it is necessary to sufficiently take the overcrowding into consideration in a step of a system design.

b. Random Access and Line Reservation Method

In the case that an amount of the transmission data is a little, only the random access method is used. In this method, in the case of transmitting the relatively large amount of data, after the communication is started by using the random access method, a signal transmission in all the other slave stations having the frequency channel in common is stopped and the specified slave station exclusively has a right for using the frequency channel. Accordingly, there is a case that an immediate performance of the communication can not follow an increase of the traffic amount.

c. Polling Method

This is a system that polling is performed to each of the slave stations from the master station at regular intervals, and each of the slave stations transmits a signal in accordance with the polling, in which the use efficiency of the line can be increased. However, there is a disadvantage that a transmission delay of the data to the master station from the slave station becomes large.

As mentioned above, in the conventional wireless network system, there have been the following problems Accordingly, in the mesh type system, since it is necessary to secure a communication with respect to the slave station having the worst condition among the system, it can not be avoided to make the transmission/receiving equipment of the slave station large, so the the economical system can not be structured. On the other hand, in the star type system, at a time of accessing the inbound wireless line, there are generated the problems that the throughput is insufficient, the flexibility with respect to the change of the traffic amount, the transmission delay is large a the like.

BRIEF SUMMARY OF THE INVENTION

A first object of the present invention is to provide a wireless network system which can perform an outbound data transmission in accordance with a system application.

A second object of the present invention is to provide a wireless network system which can structure an economical system by making a slave station compact and perform an inbound data transmission having a high throughput, a flexibility with respect to a traffic change and having a reduced transmission delay in accordance with a system application, and to provide a wireless communication apparatus of the same.

In order to achieve the first object, in accordance with the present invention, wireless network system comprises: a master station; a plurality of slave stations, the master station and the plurality o slave station being connected in a star shape through an outbound wireless line having a predetermined first transmission band area and a plurality of inbound wireless lines having a second transmission band area narrower than the outbound wireless line; a determination means for determining whether a time-division multiplex transmission method is suitable or a broad-cast transmission method is suitable for the outbound transmission method in accordance with the system application at a time of transmitting the outbound data in correspondence to a desired system application to the plurality of slave stations from the master station through the outbound wireless line; and an outbound line control means for setting a transmission path corresponding to the outbound transmission method determined to be suitable by the determination means on the outbound wireless line between the master station and the slave station. With this configuration, the determination means determines a broadcast transmission method is suitable when the system application is a remote education system, TV conference system, and the disaster system, a time-divisional transmission method is suitable when the system application is an information-on-demand and a telephone/facsimile communication system.

In accordance with the present invention, by setting the transmission band area of the outbound wireless line to that of a large amount, even in the case that the system application requires the broadcast transmission, and even in the case that the individual time-division multiplex transmission for each of the slave stations is required, the system can correspond to both transmission methods. Further, since the structure of the system is made the star type, the transmitting/receiving equipment of the multiplicity slave stations can be respectively made simple, there making the system inexpensive.

As mentioned above, at a time of transmitting the outbound data in accordance with the desired system application through the outbound wireless line, the system determines whether the time-division multiplex transmission method is suitable or the broadcast transmission method is suitable for the outbound system. Then the system sets the transmission path in correspondence to the suitable outbound transmission method on the outbound wireless line between the master station and the slave station. Accordingly, the wireless network system capable of transmitting the outbound data in correspondence to the system application can be provided.

In order to achieve the second object, in accordance with the present invention, a wireless network system comprises: a master station; a plurality of slave stations, the master station and the plurality of slave station being connected in a star shape through an outbound wireless line having a predetermined first transmission band area and a plurality of inbound wireless lines having a second transmission band area narrower than the outbound wireless line; line control means for selecting one of an access method among a plurality of access methods including a random access method, a polling method and line allocation method for each slave station and performing access control o an inbound wireless line between the plurality of slave stations and the master station. With this configuration, selecting means for selecting an access method suitable for the inbound wireless line among the plurality of access methods in accordance with a communication amount required for the system application at a time of transmitting the inbound data in correspondence to a desired system application to the master station from the plurality of slave stations through the inbound wireless line is further comprised; and an inbound line control means for performing an access control of the inbound wireless line between the plurality of slave stations and the master station by using the access method selected by the selecting means.

In accordance with the present invention, in correspondence to the amount of communication required for the system application used, the optimum access method for the inbound line is selected among the random access method, the polling method and the line allocation method. Accordingly, in comparison with the system in which the access method is predetermined fixed, the inbound wireless line can be effectively used.

Particularly, in the selecting means, the selecting means selects the random access method or the polling method for the access method to the common line to which each of the slave stations can commonly access, among the plurality of inbound wireless lines in the case that the communication amount required for the system application is equal to or less than a predetermined amount, and selects the line allocation method in the case that the communication amount required for the system application is more than the predetermined amount, and the inbound line control means transmits a line allocation request to the master station from the slave station and the master station allocates an unoccupied inbound wireless line other than the common line to the slave station transmitting the request in accordance with the request in the case that the line allocation method is selected by the selecting means.

Monitor means for monitoring an arrival of a line allocation request from each of the slave stations is further comprised, and the inbound line control means allocates a common line among the plurality of inbound wireless lines to each of the slave stations so as to make each of the slave stations transmit the inbound data in accordance with the random access method or the polling method before the line allocation request reach, and allocates an unoccupied inbound wireless line other than the common line to the slave station transmitting the request so as to make the slave station transmit the inbound data.

Preferred manners are as follows.

(1) A polling access method is selected if the system application is a remote education system.

(2) A line allocation method is selected if the system application is a TV conference system.

(3) A polling access method or a random access method is selected in accordance with data amount if the system application is an information-on-demand system.

(4) A polling access method is selected if the system application is disasters system.

(5) A line allocation method is selected in accordance with data amount if the system application is a telephone/FAX communication system.

When the structure is made the above manner, for example, in the case that a specified slave station transmits a large amount of data such as a file transmission, a static image transmission and the like, the line allocation method is selected as the access method and the unoccupied inbound wireless line other than the common line is allocated in accordance with the request of the slave station. Accordingly, in comparison with the case that the random access method or the polling method is fixedly used, the transmission of the inbound data with a high throughput and no transmission delay can be performed.

Further, in the selecting means, the structure is made such as to monitor a traffic amount of a common line to which each of the slave stations among the plurality of inbound wireless lines can commonly access, select the random access method or the polling method in the case that the access frequency of the common line is equal to or less than a predetermined amount and give a command to each of the slave stations from the master station so as to increase the allocation of the common line.

When the structure is made in the above manner, in the case that the access frequency in the system is increased during the data transmission so as not to process by the original inbound common line so that the inbound common line is increased. Accordingly, it is possible to timely and quickly respond to the increase of the traffic, so that the operation having a high flexibility can be performed with respect to the change of the traffic amount.

In accordance with the present invention, a wireless network system comprises: a master station; and a plurality of slave stations, the master station and the plurality of slave station being connected in a star shape through an outbound wireless line having a predetermined first transmission band area and a plurality of inbound wireless lines having a second transmission band area narrower than the outbound wireless line, wherein the network system utilizes a fixed frequency band width, and in order to set respective frequency band width in correspondence to a traffic amount of the inbound wireless line and the outbound wireless line, changes a transmission speed of the outbound wireless line to the plurality of slave stations from the master station by step, and changes a number of frequency channel which the inbound line from the plurality of slave stations to the master station can use.

As mentioned above, since the amount of the outbound line and the inbound line can be changed in accordance with the respective traffic amounts, the efficient use can be performed without increasing the amount of the communication line.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

An embodiment of a wireless network system in accordance with the present invention will be described below. The system in accordance with the embodiment is structured such that a plurality of slave stations (VSAT stations) are connected to a master station (a HUB station) through a wireless line having a transponder mounted in a communication satellite as a relay medium in such a manner as to have a star shape.

Figure 1:
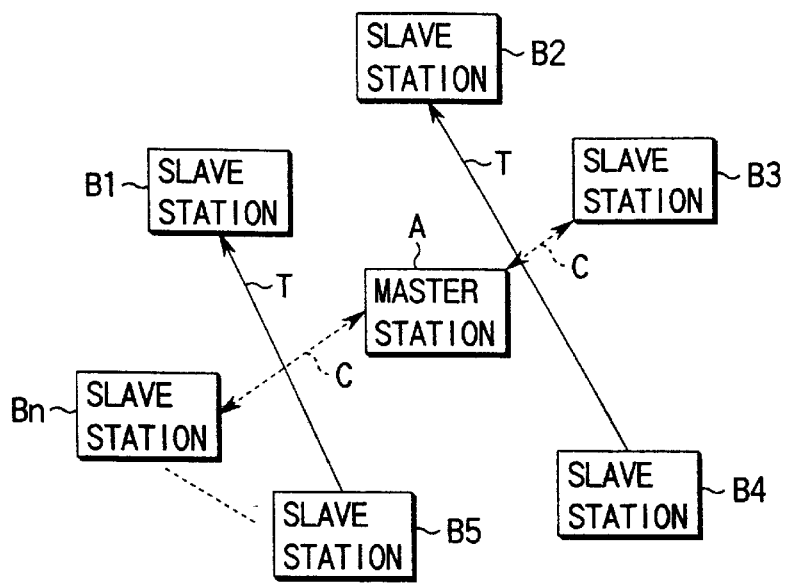
FIG. 1 is a schematic view showing a mesh type wireless network system.
Figure 2:
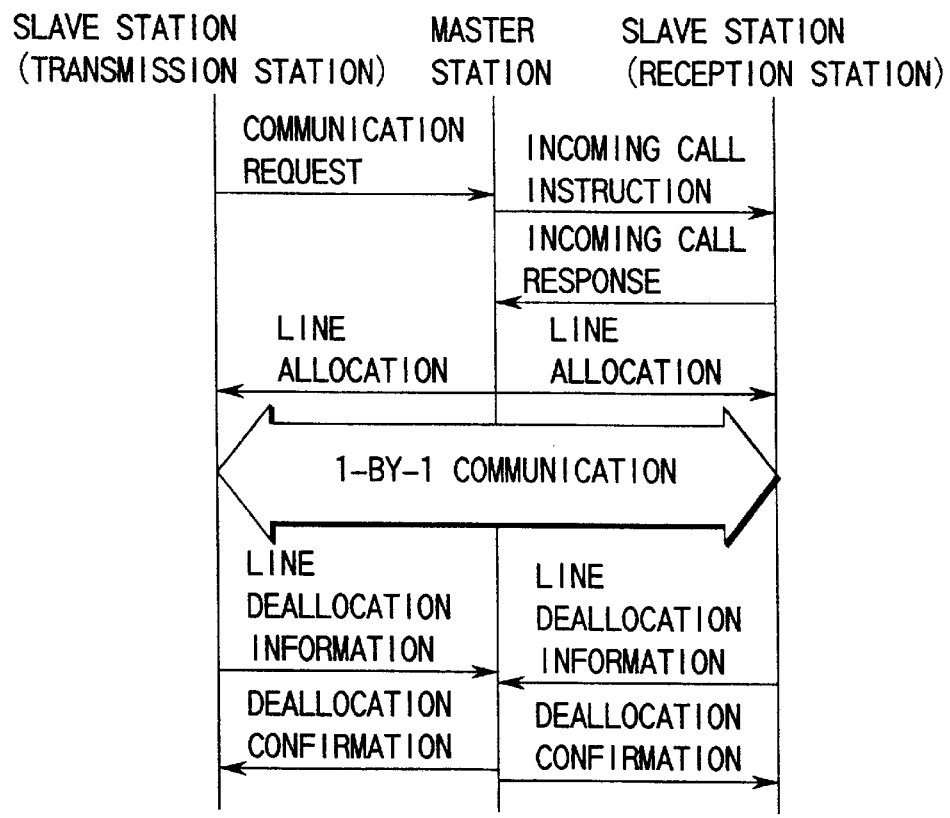
FIG. 2 is a sequential view showing a line connecting procedure of the mesh type wireless network system.
Figure 3:
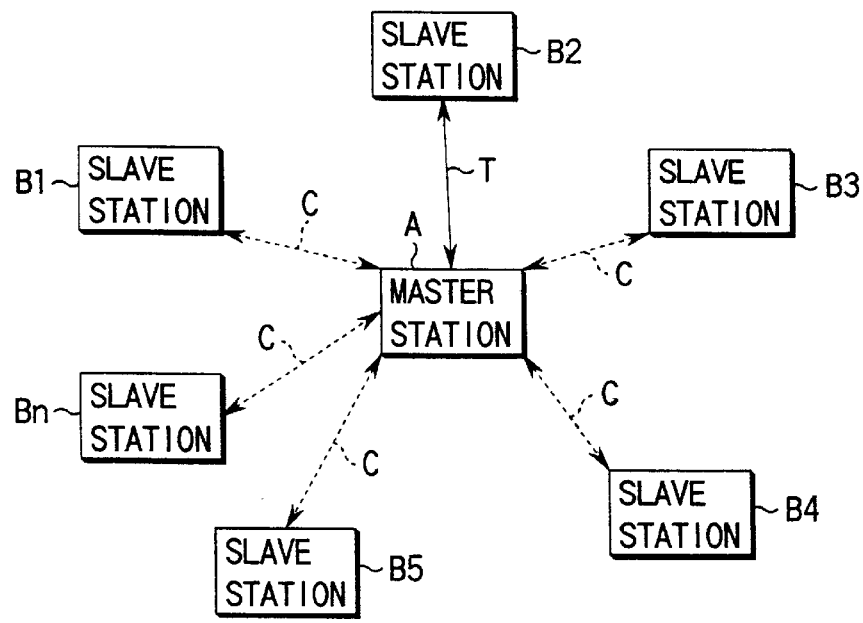
FIG. 3 is a schematic view showing a star type wireless network system.
Figure 4:
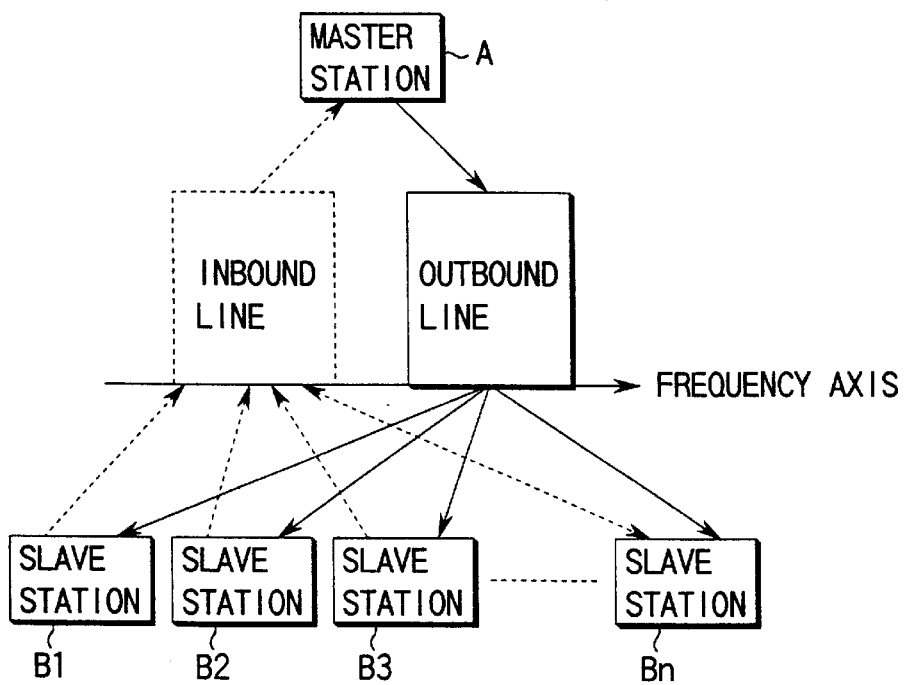
FIG. 4 is a schematic view showing a structure of the conventional wireless line in the star type wireless network system.
Figure 5:
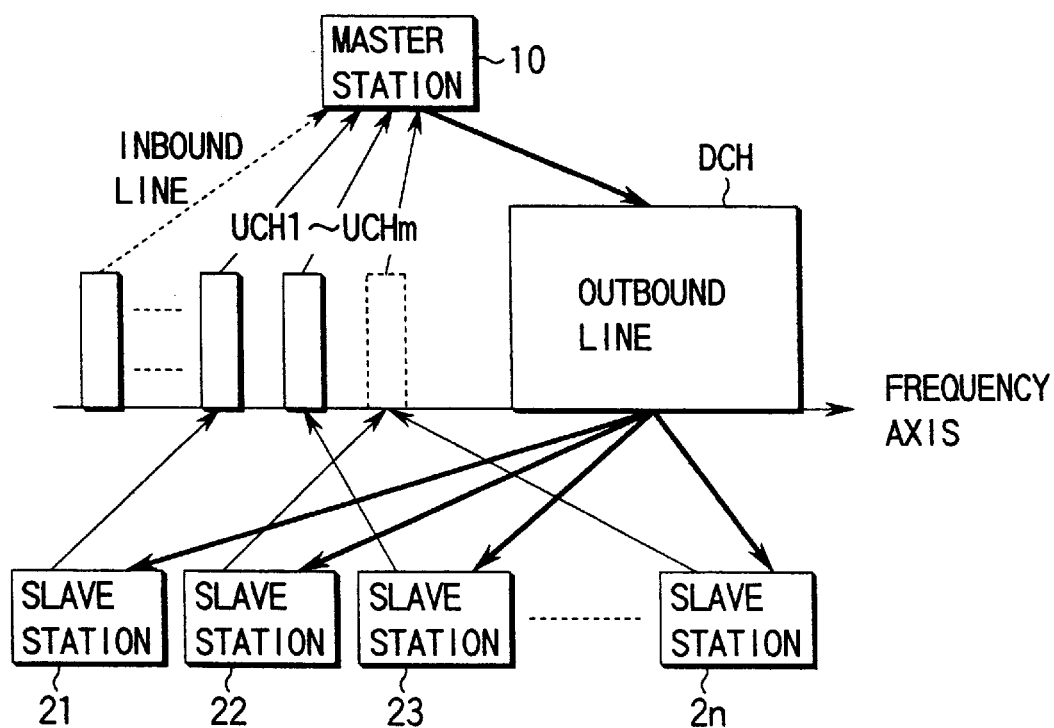
FIG. 5 is a schematic view showing a structure of a wireless line of a wireless network system in accordance with the present invention.

The wireless line in the system is structure in the following manner. FIG. 5 is a schematic view showing the structure. Accordingly, the wireless line is constituted by a channel of outbound (downstream) wireless line DCH for transmitting the outbound data to each of slave stations 21 to 2n from a master station and a plural channels of inbound (upstream) wireless: lines UCH1 to UCHm for transmitting the inbound data the master station 10 from each of the slave stations 21 to 2n. The outbound line DCH comprises a wide band area transmission path capable of transmitting sequential data of 6 Mbps.

Each of the inbound lines UCH1 to UCHm comprises a narrow band transmission path capable of transmitting packet or sequential data of 64 Kbps. Then, a partial line (for example, one line) among the inbound lines UCH1 to UCHm is used as a common line to which all the slave stations 21 to 2n can access, and for the access method, when the data transmission amount is a small, a random access method with a slot or a polling method is used, and when the data transmission amount from a specified slave station is a large amount, a line request allocation method (DAMA) requesting an allocation of the other line through the common line is used.

Figure 6:
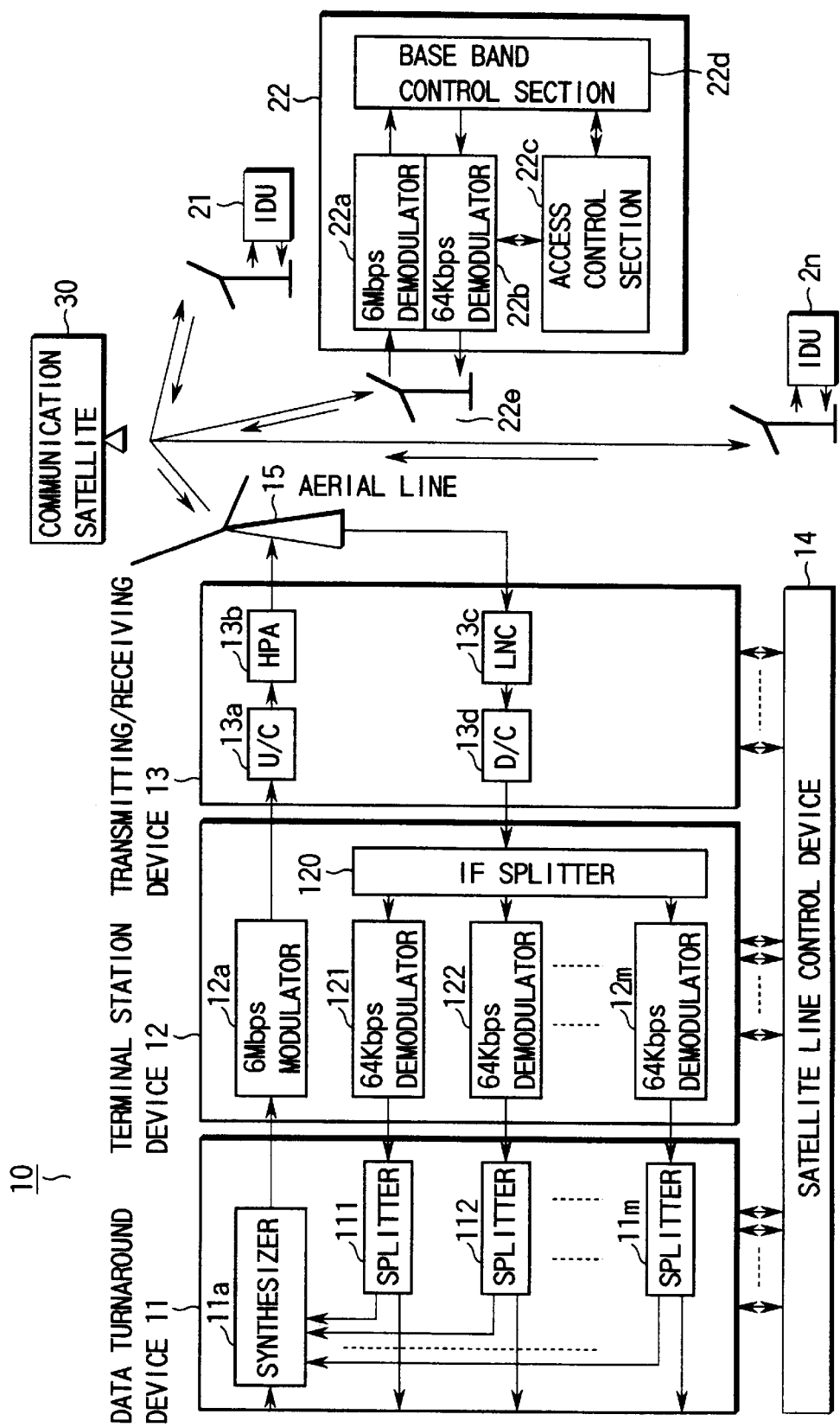
FIG. 6 is a block diagram showing an embodiment of a wireless network system in accordance with the present invention.

The system in accordance with this embodiment is structured in the following manner. FIG. 6 is a block diagram showing a line structure thereof. In FIG. 6, for example, the data having a large amount output from a host computer (not shown) having a function of a server are input to a data turnaround device 11 in the master station 10. The data turnaround device 11 synthesizes the large amount of data from the host computer with the turnaround data sampled in splitters 111 to 11m by a synthesizer 11a and supplies to an outbound modulator 12a of a terminal station device 1 The modulator 12a is an outbound modulator having a large amount in correspondence to a transmitting speed of 6 Mbps, and converts the outbound data supplied from the synthesizer 11a to a QPSK modulated wave signal so as to supply to a transmitting/receiving device 13. After the transmitting/receiving device 13 performs a frequency conversion of the QPSK modulated wave signal to a carrier wave signal having an outbound band area by a frequency up-converter (U/C) 13a, performs a power amplifier, for example, to a predetermined transmission power (for example, 100 W) by a large power amplifier (HPA) 13a, and thereafter, feeds to an aerial line 15 and transmits to a communication satellite.

The outbound wireless transmission signal transmitted from the master station 10 is relayed by the transponder in the communication satellite 30 so as to transmit to each of the slave stations 21 to 2n. Each of the slave stations 21 to 2n is provided with an aerial line 22e and an indoor device (IDU). Then, after the outbound wireless transmission signal transmitted from the communication satellite 30 is received by the antenna 22e, the outbound wireless transmission signal is input to an outbound demodulator 22a in the IDU, in which the outbound wireless transmission signal is demodulated to the outbound receiving data of 6 Mbps. The demodulated data are input to a base band control section 22d, in which for example, an error correction decoding operation and the like are performed so that the transmission data is reproduced, and thereafter, a control information of the system and the application data are identified. Then, the application data is output to a terminal device (not shown), for example, comprising a personal computer. In this case, the control information of the system is input to an access control section 22c.

In each of the slave stations 21 to 2n, the inbound data output from the terminal device is input to the base band control section 22d in the IDU, in which an error correction coding operation and the like are performed, and thereafter, the inbound data are input to an inbound modulator 22b. The inbound modulator 22b converts the inbound data to a modulated wave signal by an inbound 64 Kbps QPSK method, supplies the modulated wave signal to the aerial line 22e after performing a power-amplification of the modulated signal to a predetermined transmitting output level (for example, 0.2 W), and transmits to the communication satellite from the aerial line 22e.

The inbound wireless transmission signal transmitted from each of the slave stations 21 to 2n is transmitted to the master station 10 after relayed by the transponder in the communication satellite 30. The master station 10 inputs the inbound wireless transmission signal transmitted from the communication satellite 30 to a low noise amplifier (LNA) 13c of the transmitting/receiving device 13 after receiving the inbound wireless transmission signal by the aerial line 15, and the inbound wireless transmission signal is performed a frequency-conversion to an intermediate frequency signal by a frequency down-converter 13d after performed a low noise amplification in the low noise amplifier 13c. The received intermediate frequency signal is input to an intermediate frequency splitter (IF splitter) 120 of the terminal station device 12, in which the received intermediate frequency signal is performed a frequency-division to each of the inbound lines UCH1 to UCHm, and is distributed to the corresponding inbound demodulators 121 to 12m. The inbound demodulators 121 to 12m demodulate the input and received inbound channel signal to the base band received data of 64 Kbps, and respectively supply the inbound received data of the base band to the splitters 111 to 11m of the data turnaround device 11.

The splitters 111 to 11m sample the data to be turned around to the slave station among the inbound received data, and supply the turnaround data to the synthesizer 11a.

In this case, the master station 10 is provided with a satellite line control device 14. The satellite line control device 14 totally controls the line connection of the system and a control function there is separated into a first control means with respect to the outbound line DCH and a second control means with respect to the inbound line.

The first control means determines whether an optimum outbound transmission method is a broadcast transmission method or a time-division multiplex transmission method in accordance with the system application required by the host computer. Then, by controlling the data turnaround device 11, the terminal station device 12 and the transmitting/receiving device 13 in response to the determination result, a broadcast transmission path or a time-division multiplex transmission path is set on the outbound line DCH.

The second control means monitors a traffic amount of the common line among the respective inbound lines UCH1 to UCHm, and when the traffic amount is equal to or less than a predetermined amount, allocates the random access method or the polling method as the access method for the common line with respect to the respective slave stations 21 to 2n so as to transmit the inbound data, and when the traffic amount of the common line is over the predetermined amount, controls so as to increase the common line. In the case that the line allocation request is transmitted from a specified slave station, the second control means controls to allocate an unoccupied inbound wireless line other than the common line to the slave station transmitting the request.

The access control portion 22c is provided in the IDU of each of the slave stations 21 to 2n. The access control portion 22c performs an access control with respect to the common line of the inbound line in correspondence to the access method of the inbound line allocated by the master station 10. At a time of transmitting the inbound data, the access control portion 22c performs a control of a transmitting timing of the inbound modulator 22b and the like.

Figure 7:
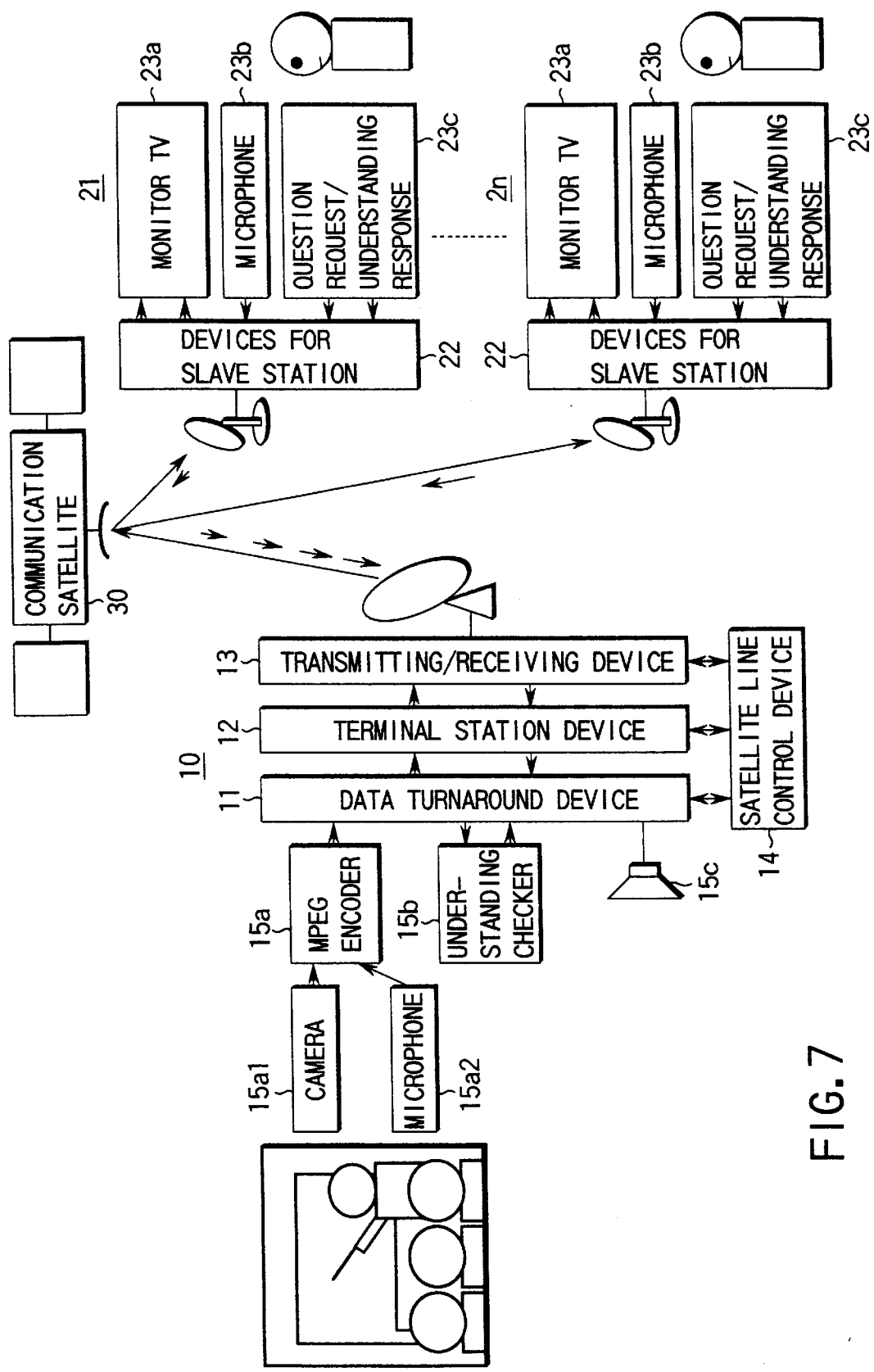
FIG. 7 is a schematic view showing a structure in the case that the present invention is applied to a remote education.

Next, an operation of the system structure in the above manner will be described with reference to an embodiment of an interactive remote education. FIG. 7 is a schematic view showing a structure of the same. In FIG. 7, the same reference numerals are attached to the same elements as those in FIG. 6 and the detailed description thereof is omitted.

In FIG. 7, at the master station side, an MPEG encoder 15a, which is connected to a camera 15a1 for inputting an image of a lecturer during lecture and a microphone 15a2 for inputting a sound data of the lecture, for compressing and encoding the image and the sound data, a understanding checker 15b for checking the understanding of the trainee and a speaker 15c for outputting the sound data from the trainee are connected to the data turnaround device 11. In each slave stations 21 to 2n, a monitor TV 23a for watching the image and listening the sound data of the lecture a microphone 23b for inputting the sound data of, e.g., question from the trainee, and an input section 23c for inputting a question request and understanding response are connected to the slave station device 22.

An operation of the remote education system constructed above will be explained.

In the remote education system, a lecturer transmits in a broadcasting manner to each of trainees a large amount of lecture image data compressed and coded by, for example, a moving picture image coding experts group 2 (MPEG2) and the like through the outbound line DCH, and in response to this, each of the trainees returns to the lecturer an information expressing an understanding and the like in the polling method by using the common line of the inbound lines. Together with this, a question of each of the trainees is transmitted to the lecturer through the other inbound line allocated in accordance with the line request, and the contents thereof is transmitted to all the trainees by using the outbound line DCH, whereby all the trainees can know the contents of the question of the other trainees. A system to realize the above system is as follows.

In the above structure, in the case of performing the present remote education system, the satellite line control device 14 of the master station 10 selects the broadcast transmission method as the transmission method for the outbound line DCH as an initialized setup method, and sets the transmission path on the outbound line DCH between the master station 10 and each of the slave stations 21 to 2n. Together with this, the satellite line control device 14 sets a predetermined channel (for example, CUH1) as a common line among the inbound lines UCH1 to UCHm, and informs the channel number of the set common channel to each of the slave stations 21 to 2n to set the access method of the common line to the polling method.

In this state, when the lecturer starts the lecture, the large amount of image data and sound data showing the lecture contents processed by the MPEG encoder 15a are transmitted to the communication satellite 30 from the master station 10 through the outbound line DCH. Then, the image data and the sound data are relayed in the communication satellite 30, and thereafter, is transmitted to each of the slave stations 21 to 2n. In each of the slave stations 21 to 2n, the image data are received and demodulated so as to be displayed on the monitor TV 23a in the terminal device of the trainee. At the same time, the sound data of the lecturer is decoded and thereafter, is expanded and output from the monitor TV 23a of the terminal device in the same manner as that of the image data.

When each of the trainees watching and listening to the lecture inputs by keys the response expressing the understanding of the contents from the input portion 23c in the terminal device of the trainee, the common line of the inbound lines is polled in each of the slave stations 21 to 2n, so that the response information mentioned above is returned to the master station 10 in the order of the slave station in which the common line is captured. Then, the response information is received and reproduced in the master station 10 through the communication satellite 30, and is transmitted to the understanding checker 15b (for example, a personal computer) of the lecturer from the master station 10 so as to be calculated and processed and then is displayed. Accordingly, the lecturer can understand the understanding of each of the trainees from the calculated result.

In this system, the trainee can transmit the question by means of the sound by using the microphone 23 prepared in the slave stations 21 to 2n and the lecturer can hear the question by the speaker 15c.

There is considered a case that an optional trainee inputs the question to the lecturer in the terminal device. In this case, the line allocation request is transmitted to the master station 10 from the slave station corresponding to the trainee through the common line which is predetermined by the master station 10 (e.g., UHC1). When the line allocation request is received, the master station 10 searches an unoccupied inbound line by the satellite line control device 14, and when the unoccupied inbound line is found, transmits the information allocating the found inbound line to the slave station transmitting the request through the outbound line DCH. When the line allocation information is received, the access control section 22c in the slave station accesses the inbound line allocated in the above manner, and when the inbound line is captured, transmits the question information mentioned above to the master station 10 through the inbound line.

The master station 10 transmits the question information transmitted through the inbound line allocated in the above manner to the understanding checker 15b of the lecturer and the inputs the information to the synthesizer 11a in the data turnaround device 11, thereby transmitting the question information to each of the slave stations 21 to 2n through the outbound line DCH. Each of the slave stations 21 to 2n receives and reproduces the question information mentioned above so as to transmit to the terminal device, and displays it. Accordingly, each of the trainees can know the question contents by the other trainees substantially at a real time, thereby taking the remote education having an ambiance under the same circumstance as that in the case of taking the lecture in a lecture room.

There is considered a case that many accesses to the common line for returning the response information mentioned above are concentrated for a short time. In this case, the master station 10 selects the unoccupied line among a plurality of inbound lines at a time when the traffic amount of the common line mentioned above is over the predetermined amount, and transmits the instruction to each of the slave stations 21 to 2n through the outbound line DCH for allocating the line for a new common line. As a result of this, the common line to which each of the slave stations 21 to 2n can access is increased thereafter, so that when the return transmission of the response information from a multiple of slave stations 21 to 2n is concentrated, the concentration of the return transmission request is canceled for a short time.

As mentioned above, in the system in accordance with the embodiment, the outbound line DCH is made a wide band transmission path capable of transmitting the sequential data of 6 Mbps, and the outbound line DCH is used for the broadcast transmission path in accordance with the system application so as to transmit the outbound data in the broadcasting manner. Accordingly, the large amount of outbound data such as the image data for the lecture can be transmitted to each of the slave stations 21 to 2n at a high speed.

In the system in accordance with the embodiment, it is structured such that at a normal time, each of the slave stations 21 to 2n accesses the common line of the inbound line by the random access method so as to transmit the inbound data, and when the traffic amount of the common line is over the predetermined amount, the master station 10 searches the other unoccupied inbound line and additionally allocates the searched line for a new common line to each of the slave stations 21 to 2n Accordingly, in the case that the returning of the response information by a multiple of trainees is concentrated for a short time and the traffic amount of the inbound common line is increased, the overcrowding can be prevented from generating by securely and rapidly responding to the increase of the traffic amount.

In the case that the request for transmitting the inbound data having a large amount of data is generated, the slave stations 21 to 2*n* transmit the line allocation request to the master station 10, and in response to the request, the master station 10 searches the inbound line so as to excessively allocate to the slave station transmitting the request. Accordingly, even in the case that an optional slave station is going to transmit the inbound data having a large amount of data, the inbound data can be sequentially transmitted regardless of the traffic state of the common line.

In this case, the present invention is not limited to the embodiment mentioned above. For example, as the system application, in addition to the interactive remote education mentioned above, the following items can be considered.

(1) Multi-points Television Meeting

Figure 8:
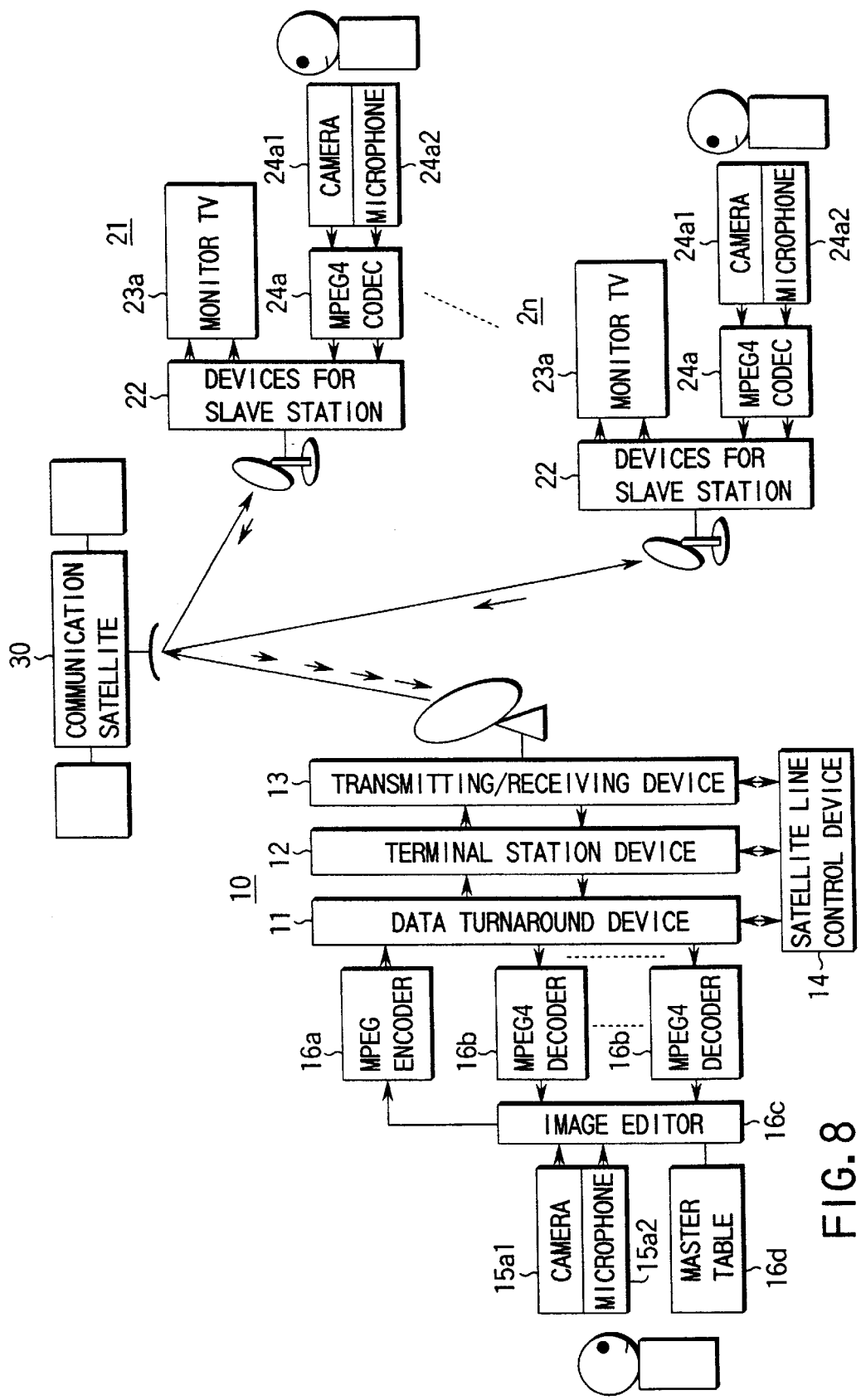
FIG. 8 is a schematic view showing a structure in the case that the present invention is applied to a multi-point television meeting.

FIG. 8 shows a schematic structure of a system for performing a multi-points television meeting. In this case, the same reference numerals are attached to the same elements as those of the embodiment mentioned above, and the detailed description is omitted. In this system, a plurality of slave stations join in the television meeting. In FIG. 8, an image editor 16*c* for synthesizing, editing the sound data and the image of the chairman and the member, an MPEG4 encoder 16*a* for compressing and encoding the sound data and the image from the image editor 16*c* and an MPEG4 decoder 16*b* for decoding the compressed image (including the sound data) transmitted from the slave stations 21 to 2*n* with this configuration, the TV conference system with so much presence can be constructed. A microphone 15*a*2 and a camera 15*a*2 for respectively inputting the sound data and the image of the chairman are connected to the image editor 16*c*. A monitor TV 23*a* for displaying the image (including the sound data) by the image editor 16*c* and an MPEG coded 24*a* for compressing the image of the member, which is connected to the microphone 24*a*2 and the camera 24*a*1 for inputting the image and the sound data of the member, is connected to the slave station device 22. In the system, since the inbound data transmission capacity increases, a line allocation method is employed as an access method to effectively transmit the inbound data of each of the slave stations.

The system constructed described above will be explained.

With this system, in the case that the application to be performed is the television meeting, since the amount of transmitting the inbound data becomes large, the line allocation method is selected as the access method for the inbound line, and the inbound line other than the common line is excessively allocated to each of the slave stations.

Then, each of the slave stations 21 to 2*n* compresses the image and sound data of the participants, for example, input from a camera 24*a*1 and a microphone 24*a*2 to a relatively low speed by an MPEG4 encoder 24*a* by using the allocated inbound line, and transmits the compressed image and sound data to the master station. The master station 10 edits and synthesizes the image and sound data transmitted from each of the slave stations with the image and sound data of the other slave stations 21 to 2*n* and the master station 10 by an image editor 16*c* so as to compress by an MPEG encoder 16*a*, and thereafter, returns to each of the slave stations 21 to 2*n* through the outbound line. Each of the slave stations receives the outbound data transmitted from the master station 10 so as to display on the monitor TV 23*a*.

Accordingly, the inbound data in each of the slave stations are efficiently transmitted to the master station, and then are transmitted to each of the slave stations from the master station. Accordingly, the multi-points television meeting can be easily realized.

(2) Information-on-Demand (Static image each and data search)

Figure 9:
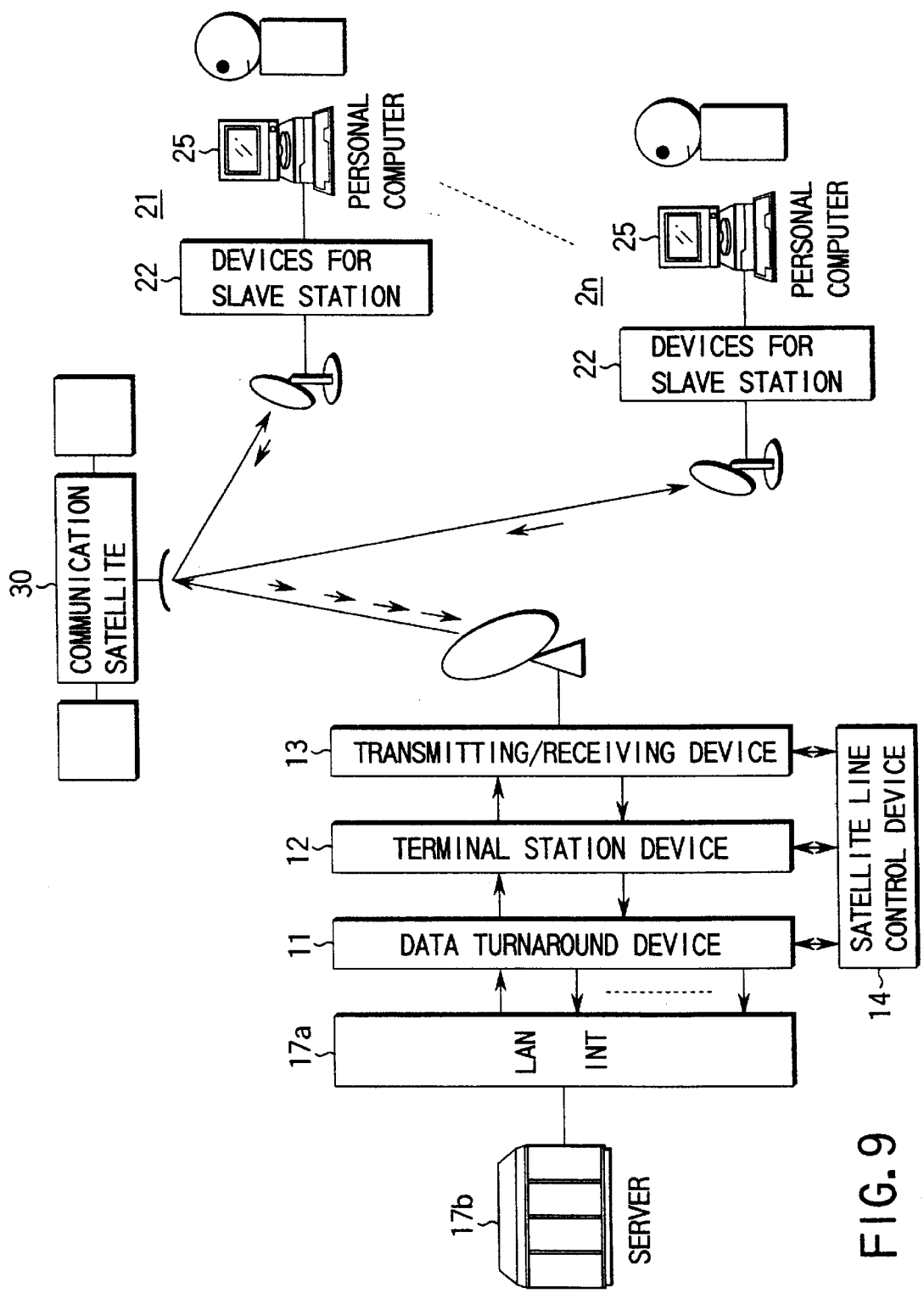
FIG. 9 is a schematic view showing a structure in the case that the present invention is applied to an information-on-demand.

A schematic structure of this system is shown in FIG. 9. In FIG. 9, the same reference numerals are attached to the same elements as those in the embodiments mentioned above and the detailed description is omitted. With this system, a service in which an information for searching an information is transmitted to the master station 10 from the slave stations 21 to 2*n* by using the inbound line is preformed. In FIG. 9, a transmission line of a LAN 17 and the like via a LANINT 17*a* is connected to the data trunaround device 11 and from here an information server 17*b* for storing various type of the information is connected to. A personal computer and the like, which are used as information retrieving request input device retrieving result display device, are connected to the slave station device 22.

The system constructed described above will be explained.

To execute the application, since information retrieving traffic is generally little, a random access method is employed as an access method for the common line of the inbound line. If the traffic becomes beyond the predetermined amount, the number of the common line is increased.

An information for searching an information is transmitted to the master station 10 from the slave stations 21 to 2*n* by using the inbound line. The slave stations access an information server 17*b* such as a video server, a mail server and the like which is disposed within the master station 10 or in the master station 10 through a transmission line such as a LAN 17 and the like in accordance with the information search information. Then, the static image information and the data searched by this access is transmitted to the slave stations 21 to 2*n* transmitting the search information from the master station 10 by using the outbound line, and the slave stations 21 to 2*n* confirm the contents of the search information by a personal computer 25 and the like.

(3) Prevention System of Disasters and Telephone/FAX Communication

Figure 10:
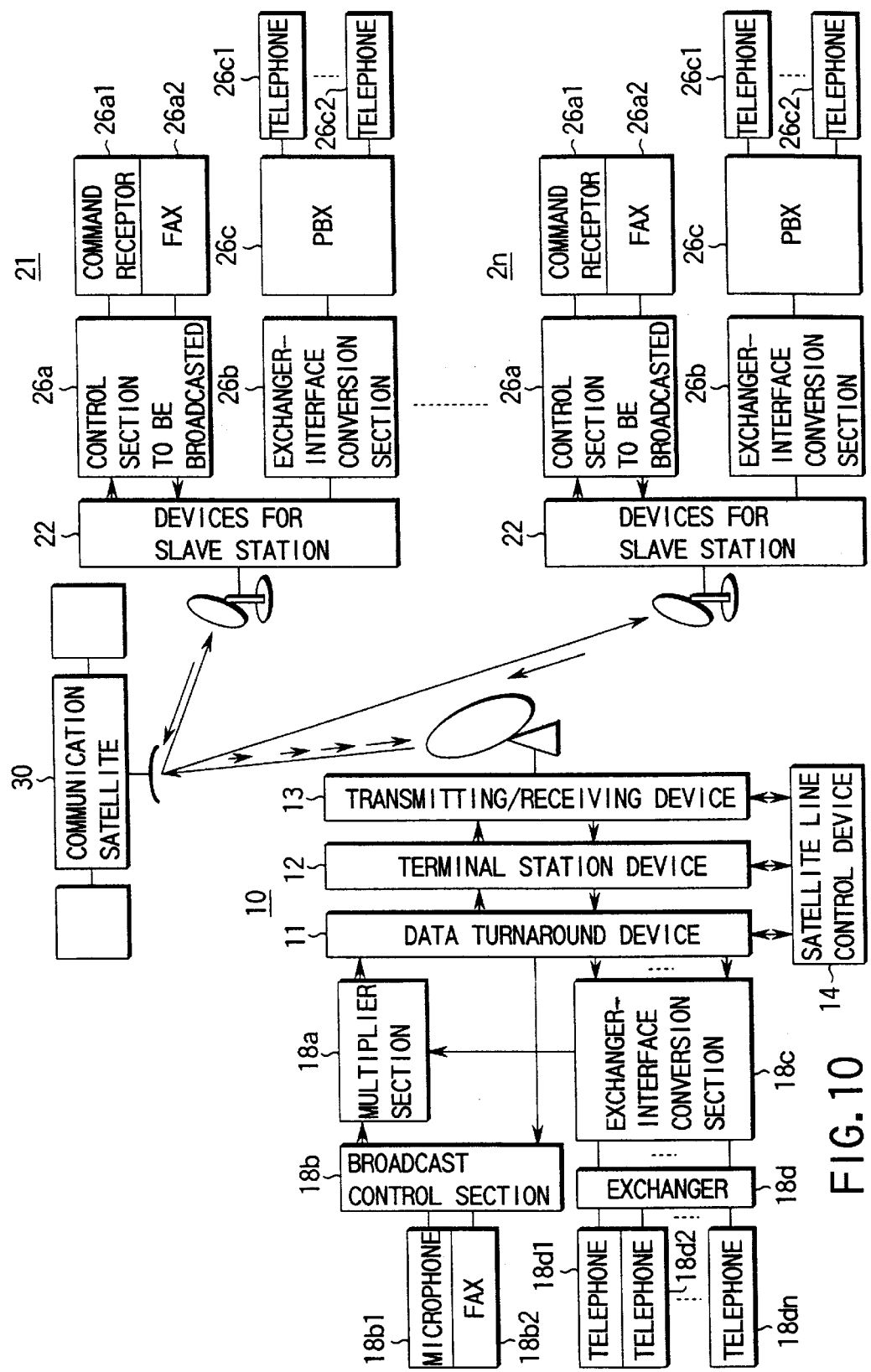
FIG. 10 is a schematic view showing a structure in the case that the present invention is applied to a prevention system of disasters and a telephone/fax communication system.

A schematic structure of the prevention system of disasters and telephone/FAX communication system is shown in FIG. 10. In FIG. 10, the same reference numerals are attached to the same elements as those of the embodiments mentioned above, and the detailed description is omitted.

In the case of realizing the prevention system of disasters, there are required a plurality of applications such as (a) a broadcast by a sound or a facsimile, (b) a television image transmission and (c) a personal telephone/facsimile communication. An embodiment corresponding to each of the above applications will be described below.

In FIG. 10, broadcast control section 18*b* for executing broadcast and data from broadcast control section 18*b* is multiplexed with data from the exchange interface conversion section 18*c* in the multiplier section 18*a*. The microphone 18*b*1 and the FAX device 18*b*2 are connected to the broadcast control section 18*b* to input sound and image data. A plurality of extension telephones 18*d*1 to 18*dn* are connected to the exchange interface conversion section 18*c* via the exchange 18*d*. The broadcasted control section 26*a* and the exchange interface conversion section 26*b* are connected to slave station device 22 and the command receptor 26*a*1 and the FAX 26*a*2 are connected to the broadcasted control section 26*a*. A plurality of extension telephones 26*c*1 to 26*cn* are connected to the exchange interface conversion section 26*b* via the exchange 26*c*.

In system constructed described above, individual system will be explained.

(a) Broadcast by a Sound or a Facsimile

In the case that the broadcast is performed with respect to each of the slave stations 21 to 2*n* by the master station 10, the command information is transmitted in a broadcasting manner by a sound or a facsimile by means of a microphone 18*b*1 or a FAX 18*b*2 through a broadcast control section 18*b* and a multiplier section 18*a* simply by using the outbound line, and the slave stations 21 to 2*n* receive the command information by a command receptor 26*a*1 or a FAX 26*a*2 through a control section to be broadcasted 26*a*. On the other hand, a command reception confirmation information in corresponding to the command information received by each of the slave stations 21 to 2*n* is collected to the master station 10 from the corresponding slave station through the control section to be broadcasted 26*a* by using the polling method. By structuring in the above manner, the transmission of the command information can be accurately and efficiently performed.

For example, a broadcast from a specified slave station 21 to other slave stations 22 to 2*n* will be explained.

The line allocation request is transmitted from the specified slave station 21 to the master station 10 so that the excessive inbound line is allocated, and the specified slave station 21 transmits the broadcast information by using the allocated inbound line. The master station 10 collects the broadcast information and transmits to the other slave stations 21 to 2*n* by using the outbound line. In this case, each of the command reception confirmation information of each of the slave stations 22 to 2*n* receiving the broadcast mentioned above is collected to the master station 10 from each of the slave stations 22 to 2*n* by using the polling method in the same manner as that of the broadcast from the master station 10 mentioned above. When the master station 10 receives the command reception confirmation information from all the slave stations 22 to 2*n*, an information corresponding to the information is transmitted to the specified slave station 21 from the master station 10 by using the outbound line.

(b) Television Image Transmission

A system for transmitting a compressed instruction image data (not shown) will be explained. This case is basically also the same as the above system.

A command image data compressed by an MPEG2 and the like are transmitted in a broadcasting manner to each of the slave stations 21 to 2*n* from the master station 10 by using the outbound line. In the case that the slave station 21 to 2*n* transmits the image data of a stricken area and the like to a prevention center of disasters provided in the master station, the inbound line is excessively allocated to the slave station 21 to 2*n* by using the line allocation method, and the slave station 21 to 2*n* transmits the image data of the stricken area and the sound data of the reporter to the prevention center of disasters in the master station 10 by using the allocated inbound line.

(c) Personal Telephone/Facsimile Communication

When an optional user performs a communication request by a telephone, the line allocation request is transmitted to the master station 10 from, e.g., the slave station 21 connected to the telephone through the common line. When the master station 10 receives the request, the master station 10 searches an unoccupied inbound line so as to instruct the line allocation to the slave station 21 to 2*n* transmitting the request. The master station 10 allocates another inbound line to the slave station 21 corresponding to a reception station 22 through the outbound line.

In this state, when the user in one slave station 21 transmits, the sound data is transmitted to the master station 10 through the allocated inbound line, is turned around in the master station 10 so as to be transmitted to the other slave station 22 through the outbound line, and is received. The transmission sound data in the other slave station 22 are transmitted to the master station 10 through the allocated inbound line, is turned around in the master station so as to be transmitted to the one slave station through the outbound line, and is received. In this case, in the transmission of the sound data from the master station 10 to each of the slave station, the time-division multiplex transmission method is used. Accordingly, a two-way conversation or a facsimile communication is performed between two slave stations.

In the case that a number of the channels in the inbound line is insufficient in using the communication line, the transmission from each of the slave stations can not be performed. In this case, when the amount of the outbound line is sufficient, the problem can be solved by allocating a part of the outbound line to the inbound line.

Figure 11A:
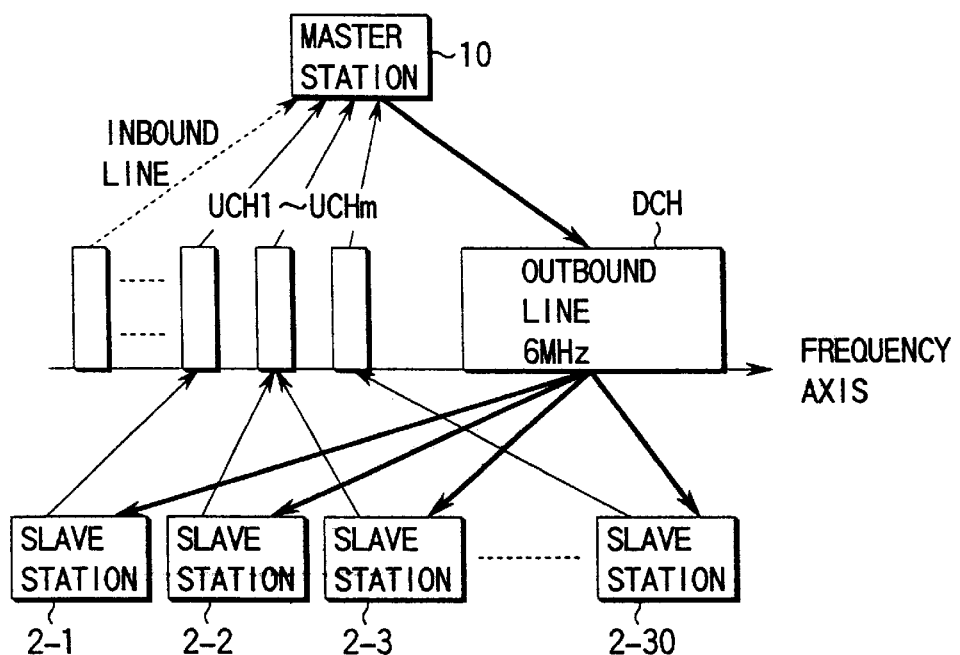
FIGS. 11A and 11B are schematic views showing an embodiment in the case that a frequency band width is changed in accordance with a use state of a line.
Figure 11B:
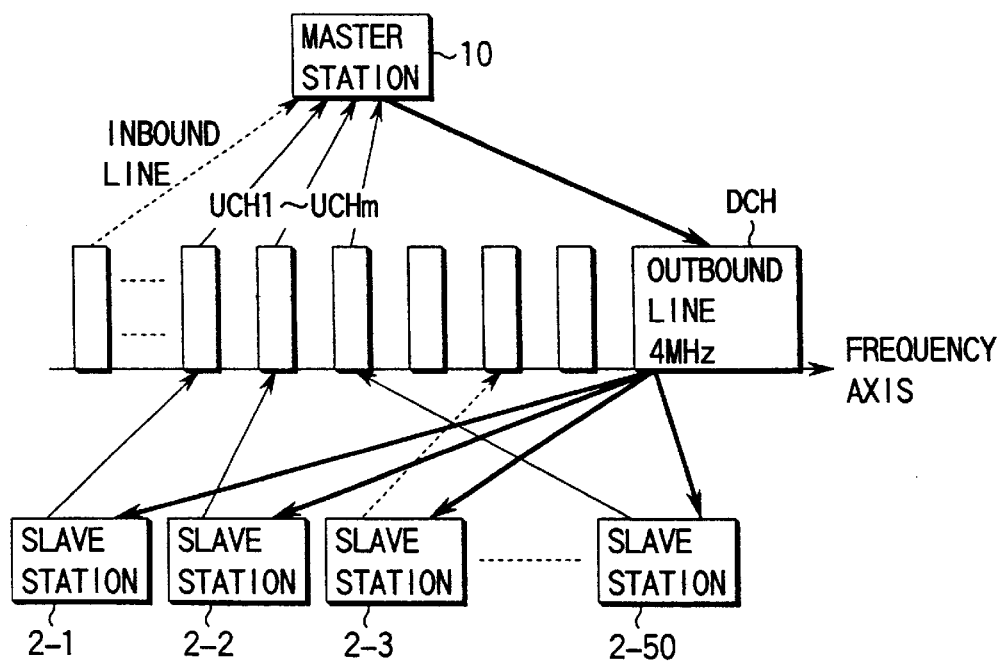

FIGS. 11A and 11B is a schematic view showing an embodiment in which a frequency band width is not fixed and is changed in accordance with the use state of the lines with being different from the embodiments mentioned above.

In FIG. 11A, for example, an outbound line of 6 MHz and thirty waves of inbound lines of 10 kHz, that is, totally the lines of 9 MHz are used. In accordance with the application, in the case that an information amount of the outbound line is a little and an information amount of the inbound line is much, the frequency band of 9 MHz is inefficiently used. In order to solve the problem, as shown in FIG. 11B, when it is made possible to dynamically change such that an outbound line of 4 MHz and fifty waves of inbound lines of 100 kHz can be used, the information amount of the inbound line can be increased and the frequency band width of the same 9 MHz can be efficiently used in an improved manner.

In each of the embodiments mentioned above, the explanation is given to the case of connecting between the master station and the slave stations through the communication satellite for the embodiment, however, the present invention can be also applied to a system which directly performs a wireless communication by a ground wave without passing through the communication satellite.

In addition to this, with respect to the structure of the master station and the slave station, the structure of the outbound line and the inbound line, the data transmission format and the modulating method, the number of the common line, the threshold for determining the data transmission amount and the traffic amount and the like, they can be variously modified and performed within the scope of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A wireless network system comprising:
   a master station;
   a plurality of slave stations, said master station and said plurality of slave stations being connected in a star shape through an outbound wireless line having a predetermined first transmission band area and a plurality of inbound wireless lines each having a second transmission band area narrower than said first transmission band area;
   a determination means for determining whether a time-division multiplex transmission method or a broadcast transmission method is suitable as an outbound transmission method in accordance with a system application at a time of transmitting outbound data in correspondence to the system application to the plurality of slave stations from said master station through said outbound wireless line; and an outbound line control means for setting a transmission path corresponding to the outbound transmission method determined to be suitable by the determination means on said outbound wireless line between said master station and said plurality of slave stations.

2. A wireless network system according to claim 1, wherein said determination means determines a broadcast transmission method is suitable when said system application is at least one of a remote education system, a TV conference system, and a disaster system, and a time-divisional transmission method is suitable when said system application is at least one of an information-on-demand and a telephone/facsimile communication system.

3. A wireless network system comprising:

a master station;

a plurality of slave stations, said master station and said plurality of slave stations being connected in a star shape through an outbound wireless line having a predetermined first transmission band area and a plurality of inbound wireless lines each having a second transmission band area narrower than said first transmission band area; and line control means for selecting one of an access method from a plurality of access methods including a random access method, a polling method and line allocation method for each of said plurality of slave stations, and performing access control of at least one of said plurality of inbound wireless lines between each of said plurality of slave stations and said master station.

4. A wireless network system according to claim 3, further comprising:

selecting means for selecting an access method suitable for at least one of said plurality of inbound wireless lines from said plurality of access methods in accordance with a communication amount required for a system application at a time of transmitting inbound data in correspondence to the system application to said master station from said plurality of slave stations through one of said plurality of inbound wireless lines; and an inbound line control means for performing an access control of the one of said plurality of inbound wireless lines between said plurality of slave stations and said master station by using the access method selected by the selecting means.

5. A wireless network system according to claim 4, wherein said selecting means selects the random access method or the polling method for the access method to a common line to which each of the plurality of slave stations can commonly access, among said plurality of inbound wireless lines in a first case where a communication amount required for the system application is equal to or less than a predetermined amount, and selects the line allocation method in a second case where the communication amount required for the system application is greater than said predetermined amount, and said inbound line control means transmits a line allocation request to the master station from one of said plurality of slave stations and the master station allocates an unoccupied one of said plurality of inbound wireless lines other than said common line to the one of said plurality of slave stations transmitting the line allocation request in accordance with the line allocation request in the case that the line allocation method is selected by said selecting means.

6. A wireless network system according to claim 5, wherein a polling access method is selected if the system application is a remote education system.

7. A wireless network system according to claim 5, wherein a line allocation method is selected if the system application is a TV conference system.

8. A wireless network system according to claim 5, wherein a polling access method or a random access method is selected in accordance with data amount if the system application is an information-on-demand system.

9. A wireless network system according to claim 5, wherein a polling access method is selected if the system application is disasters system.

10. A wireless network system according to claim 5, wherein a line allocation method is selected in accordance with data amount if the system application is a telephone/FAX communication system.

11. A wireless network system according to claim 3, further comprising monitor means for monitoring an arrival of a line allocation request from each of said plurality of slave stations, wherein said line control means allocates a common line among said plurality of inbound wireless lines to each of the plurality of slave stations so as to make each of the plurality of slave stations transmit inbound data in accordance with the random access method or the polling method before said line allocation request reach, and allocates an unoccupied one of said plurality of inbound wireless lines other than said common line to one of said plurality of slave stations transmitting the request so as to make the one of said plurality of slave stations transmit the inbound data.

12. A wireless network system according to claim 11, wherein a polling access method is selected if a system application is a remote education system.

13. A wireless network system according to claim 11, wherein a line allocation method is selected if a system application is a TV conference system.

14. A wireless network system according to claim 11, wherein a polling access method or a random access method is selected in accordance with data amount if a system application is an information-on-demand system.

15. A wireless network system according to claim 11, wherein a polling access method is selected if a system application is disasters system.

16. A wireless network system according to claim 11, wherein a line allocation method is selected in accordance with data amount if a system application is a telephone/FAX communication system.

17. A wireless network system according to claim 3, further comprising means for monitoring a traffic of the common line commonly allocated to each of the plurality of slave stations among said plurality of inbound wireless lines, wherein said line control means allocates said plurality of inbound wireless lines other than a common line to each of said plurality of slave stations as a new common line by transmitting an instruction if access of said common line exceeds a predetermined amount.

18. A wireless network system comprising:

a master station; and a plurality of slave stations, said master station and said plurality of slave stations being connected in a star shape through an outbound wireless line having a predetermined first transmission band area and a plurality of inbound wireless lines each having a second transmission band area narrower than said first transmission band, wherein said network system utilizes a fixed frequency band width, and in order to set respective frequency band width in correspondence to a traffic amount of said plurality of inbound wireless lines and said outbound wireless line, changes a transmission speed of said outbound wireless line to said plurality of slave stations from said master station by step, and changes a number of frequency channel which said plurality of inbound lines from said plurality of slave to said master station can use.

19. A wireless network system comprising:

a master station;

a plurality of slave stations in a star configuration with the master station such that each of the plurality of slave stations has a wireless connection to the master station;

an outbound wireless line having a predetermined first transmission bandwidth configured to communicate from the master station to each of the plurality of slave stations;

a plurality of inbound wireless lines, each having a second transmission bandwidth narrower than the first transmission bandwidth and configured to communicate from the plurality of slave stations to the master station;

a determination mechanism configured to determine to use one of a time-division multiplex transmission method and a broadcast transmission method as a transmission method for communicating from the master station to the plurality of slave stations through the outbound wireless line according to a system application; and an outbound line control mechanism configured to set a transmission path between the master station and the plurality of slave stations corresponding to the transmission method determined by the determination mechanism.

20. The system of claim 19, wherein:

the determination mechanism is configured to determine to use the broadcast transmission method when the system application is at least one of a remote education system, a TV conference system, and a disaster system, and to use the time-division multiplex transmission method when the system application is at least one of an information-on-demand and a telephone/facsimile communication system.

21. A wireless network system comprising:

a master station;

a plurality of slave stations in a star configuration with the master station such that each of the plurality of slave stations has a wireless connection to the master station;

an outbound wireless line having a predetermined first transmission bandwidth configured to communicate from the master station to each of the plurality of slave stations;

a plurality of inbound wireless lines, each having a second transmission bandwidth narrower than the first transmission bandwidth and configured to communicate from the plurality of slave stations to the master station;

a line control mechanism configured to select one of a random access method, a polling access method and a line allocation access method as an access method for each of the plurality of slave stations and to perform access control for at least one of the plurality of inbound wireless lines.

22. The system of claim 21, wherein:

the line control mechanism is configured to select the access method based on a bandwidth amount required by a system application at a time of transmitting data from the plurality of slave stations to the master station through one of the plurality of inbound wireless lines and to perform access control for the one of the plurality of inbound wireless lines using the access method selected.

23. The system of claim 22, wherein:

the line control mechanism is configured to select one of the random access method and the polling access method as the access method for each of the plurality of slave stations to a common one of the plurality of inbound wireless lines when a bandwidth required by the system application is equal to or less than a predetermined amount, to select the line allocation access method as the access method when the bandwidth required is greater than the predetermined amount, and to transmit a line allocation request to the master station from one of the plurality of slave stations, and the master station is configured to allocate an unallocated one of the plurality of inbound wireless lines different from the common one to the one of the plurality of slave stations in response to the line allocation request when the access method selected by the line control means is the line allocation access method.

24. The system of claim 23, wherein:

the line control mechanism is configured to select the polling access method as the access method when the system application is a remote education system.

25. The system of claim 23, wherein:

the line control mechanism is configured to select the line allocation access method as the access method when the system application is a TV conference system.

26. The system of claim 23, wherein:

the line control mechanism is configured to select one of the polling access method and the random access method as the access method based on an amount of data required by the system application if the system application is an information-on-demand system.

27. The system of claim 23, wherein:

the line control mechanism is configured to select the polling access method as the access method when the system application is a disaster system.

28. The system of claim 23, wherein:

the line control mechanism is configured to select the line allocation access method as the access method based on an amount of data required by the system application if the system application is a telephone/facsimile communication system.

29. The system of claim 21, further comprising:

a monitoring mechanism configured to monitor an arrival of a line allocation request from each of the plurality of slave stations, wherein the line control mechanism is configured to allocate a common one of the plurality of inbound wireless lines to the plurality of slave stations such that each of the plurality of slave stations will use one of the random access method and the polling access method until the monitoring means monitors the arrival of a line allocation request from one of the plurality of slave stations, and to allocate an unoccupied one of the plurality of inbound wireless lines different from the common one to the one of the plurality of slave stations to transmit inbound data.

30. The system of claim 29, wherein:
the line control mechanism is configured to select the polling access method as the access method when the system application is a remote education system.

31. The system of claim 29, wherein:
the line control mechanism is configured to select the line allocation access method as the access method when the system application is a TV conference system.

32. The system of claim 29, wherein:
the line control mechanism is configured to select one of the polling access method and the random access method as the access method based on an amount of data required by the system application if the system application is an information-on-demand system.

33. The system of claim 29, wherein:
the line control mechanism is configured to select the polling access method as the access method when the system application is a disaster system.

34. The system of claim 29, wherein:
the line control mechanism is configured to select the line allocation access method as the access method based on an amount of data required by the system application if the system application is a telephone/facsimile communication system.

35. The system of claim 21, further comprising:
a monitoring mechanism configured to monitor traffic of a common one of the plurality of inbound wireless lines allocated to the plurality of slave stations, wherein the line control mechanism is configured to allocate another one of the plurality of inbound wireless lines other than the common one of the plurality of inbound wireless lines to the plurality of slave stations when the monitoring mechanism monitors traffic exceeding a predetermined amount.

36. A wireless network system comprising:

a master station;

a plurality of slave stations in a star configuration with the master station such that each of the plurality of slave stations has a wireless connection to the master station;

an outbound wireless line having a predetermined first transmission bandwidth configured to communicate from the master station to each of the plurality of slave stations; and a plurality of inbound wireless lines, each having a second transmission bandwidth narrower than the first transmission bandwidth and configured to communicate from the plurality of slave stations to the master station, wherein a transmission speed of the outbound wireless line is changed in steps and a number of frequency channels of the plurality of inbound lines is changed based on a change in the level of traffic such that a combined frequency bandwidth of the outbound wireless line and the plurality of inbound wireless lines remains constant.

* * * * *